Figure 1:
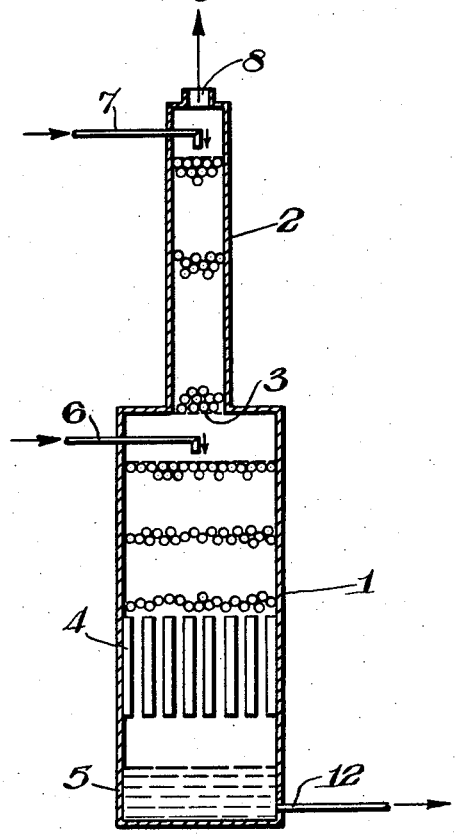

June 29, 1965   F. BRANDMAIR ETAL   3,192,128
PROCESS FOR PURIFYING AQUEOUS HYDROCHLORIC ACID
Filed July 3, 1962

INVENTORS
Franz Brandmair
Ernst Kolbe
Werner Kunzer
BY Connolly and Hutz
ATTORNEYS United States Patent Office 3,192,128
Patented June 29, 1965

3,192,128
PROCESS FOR PURIFYING AQUEOUS
HYDROCHLORIC ACID
Franz Brandmair and Ernst Kolbe, Frankfurt am Main, and Werner Kunzer, Ludwigshafen-Friesenheim, Germany, assignors to Farbwerke Hoechst Aktiengesellschaft vormals Meister Lucius & Bruning, Frankfurt am Main, Germany, a corporation of Germany
Filed July 3, 1962, Ser. No. 207,227
Claims priority, application Germany, July 11, 1961,
F 34,398
4 Claims. (Cl. 202—46)

The present invention relates to a process for purifying aqueous hydrochloric acid by removing volatile substances dissolved or suspended therein. These volatile substances may be, for example, elementary chlorine, organic compounds or chlorinated organic compounds which are normally contained in hydrochloric acid emanating from chlorination processes for organic substances.

It is known that such volatile contamination can be removed with the aid of absorbents, for example, active carbon filters. The apparatus used for carrying out this removal is very expensive because two alternately operating filter installations have to be erected; and, moreover, the regeneration of the filters is very costly.

It is also known that this volatile contamination can be removed by atomizing hydrochloric acid with air. By such treatment of the hydrochloric acid, a considerable amount of hydrogen chloride gas is also expelled which is obtained in admixture with the other expelled volatile contamination and diluted with great amounts of air which makes the HCl gas recovery difficult. Moreover, the purification is often unsatisfactory depending on the type of contamination involved.

The present invention overcomes the above disadvantages by a process for purifying aqueous hydrochloric acid containing volatile dissolved or suspended contamination wherein the contaminated hydrochloric acid is contacted with steam in a distributed state to release the contamination and the HCl vapors, the latter acting as carrier for the former. The evaporating contamination and the hydrogen chloride vapors which escape simultaneously from the hydrochloric acid are conducted counter-currently to a distributed stream of hot water, a portion of which stream evaporates to form steam which acts as a carrier to pick up and carry off the evaporated contaminations, whereas the hydrogen chloride vapors, the former carrier for the contamination, are absorbed by the water and the aqueous hydrochloric acid thus obtained is combined with the hydrochloric acid to be purified. The hydrochloric acid to be treated is either relatively hot or, if supplied cold, heated preferably to boiling temperature. A purification effect can also be obtained with cold hydrochloric acid, but the effect is the weaker the colder the acid supplied, especially in the case where high-boiling contamination is concerned. The temperature to be used in a given case depends substantially on the type of contamination present in the acid and can therefore readily be determined.

The purification effect depends essentially on the coefficient of distribution of the contaminating substance in the liquid and the vaporous phases. Since with rising temperature this coefficient changes in the favour of the vaporous phase the purification effect is the better the higher the temperature. In particular, in cases in which the contaminations are relatively difficult to expel the contaminated acid is advantageously supplied as hot as possible, suitably at boiling temperature.

The purification effect is best in cases where the contaminating substances are aliphatic or aromatic hydrocarbon compounds or chlorination products thereof. In cases where the contaminating substances contain groups of atoms different from those mentioned above a purification effect of practical interest can be obtained, too. The purification effect is the weaker the stronger the hydrophile character of the aforesaid groups in the contaminating substances. Organic substances having a basic character, for example, aniline, are present in the solution in the form of salts and cannot be removed. Of a group of chemically similar substances such as, for example, benzene, toluene and xylene, the substance having the lowest boiling point can best be removed.

In the process of this invention, the contamination is evaporated from the crude supply acid, a portion of the hydrogen chloride gas being simultaneously evaporated. This HCl gas is replaced, as contamination carrier, in the course of the purification process by steam, so that the contamination to be expelled is finally diluted with steam to such an extent that condensation or noteworthy dissolution of the contamination to the liquid phase cannot take place. The hydrogen chloride gas first expelled with the vapors is so recovered by adiabatic absorption that the concentration of the purified, liquid hydrochloric acid is not reduced or is only reduced to a degree tolerable in practice.

As compared with the processes known for purifying aqueous hydrochloric acid, the process of the present invention permits the continuous purification of aqueous hydrochloric acid substantially without loss of acid and with relatively little expense.

FIG. 1 of the drawing represents diagrammatically an apparatus suitable for use in carrying out the invention wherein a heat exchanger is utilized to supply heat and evaporate HCl and contaminants.

Figure 2:
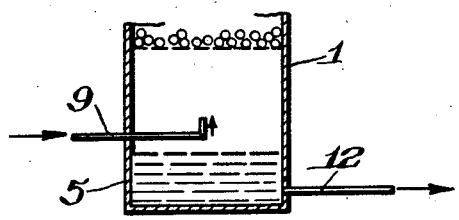

FIG. 2 is a fragmentary showing of the base of the apparatus of FIG. 1 showing an alternative embodiment wherein steam is directly injected into the aparatus.

As seen in FIG. 1, a packed column 1 with a diameter larger than a packed column 2 is disposed below column 2. A port 3 provides access from one column to the other. A heat exchanger 4 serves as an evaporator and is designed as a descending film apparatus being connected to a collecting vessel 5 and packed column 1 to form a unit. The descending film apparatus may be replaced by another type of heat exchanger, and the individual portions of the apparatus may be arranged in a manner different from that described above.

The process is carried out by first heating the contaminated hydrochloric acid, if supplied cold, to boiling temperature in a heat exchanger not shown in the drawing. When it is intended that the purified aqueous hydrochloric acid be used for the manufacture of pure HCl gases by distillation, it is advantageous to use as heating medium for the cold contaminated acid the hot evaporated acid emanating from such distillation.

The hot acid, or the acid heated as described above or in a different manner, is introduced through inlet 6 into the lower packed column 1 through which it trickles counter-currently to the hydrogen chloride and water vapors produced by and rising from evaporater 4 which expels and entrains the contamination whereby purified, hot acid is obtained in the collecting vessel 5 and removed through outlet means 12. When it is intended to produce free HCl gases by distillation, the acid obtained in the collecting vessel may be introduced immediately into a distilling column.

The hydrogen chloride and water vapor charged with the contamination provide vapors which contain a considerable proportion of hydrogen chloride, especially when highly concentrated acids are purified. These vapors pass upward from packed column 1 through port 3 to enter packed column 2 charged through inlet 7 with water, preferably at boiling temperature. A purification effect is even obtained if the water added is cold. However, the degree of purification, especially where high-boiling contaminations are concerned, is the weaker the colder the water used. The temperature of the water to be used in a given case depends substantially upon the type of contamination and can readily be determined in each case. In packed column 2, the hydrogen chloride carrying the volatile contamination and gases escaping from column 1 are absorbed by the water. An amount of water equivalent to the heat of absorption evaporates to steam according to the principle of the adiabatic absorption of hydrochloric acid. This steam then replaces the absorbed hydrogen chloride gas as carrier for the contamination whereby a mixture of steam and gaseous contamination escapes at the top port 8 of packed column 2. The hydrogen chloride introduced in vapor form into packed column 2 returns in the form of aqueous hydrochloric acid into packed column 1 and is combined there with the fresh hydrochloric acid being supplied through inlet 6.

The issuing water vapors charged with the contamination may be condensed, if desired, and the condensate introduced into a separating vessel for recovering the foreign material entrained.

The amount of water fed through inlet 7 is advantageously so selected that a concentrated hydrochloric acid of about 30% to about 32% by weight is discharged from packed column 2. Smaller amounts of water involve losses of hydrogen chloride.

The dimensions of packed column 2 and the amounts of heat supplied to evaporator 4 are advantageously selected so that the amount of water required for scrubbing packed column 2 is not substantially greater than the amount of steam escaping at the top port 8. The purified acid obtained in collecting vessel 5 is only very slightly diluted as compared with the crude acid introduced at 6.

Alternatively, as shown in FIG. 2, the evaporator 4 may be omitted and the contamination expelled by direct injection of steam into packed column 1 through inlet 9. The greater dilution of the acid flowing off can often be tolerated.

Those parts of the apparatus used which are subjected to corrosive stress are advantageously made of graphite material impregnated with an artificial resin.

The following example serves to illustrate the invention, but it is not intended to limit the invention thereto:

*Example*

Hydrochloric acid of an average concentration of 34% obtained in a quantity of 9,700 kg./hr. and having a temperature of about 40° C. contained as contamination about 5 kg./hr., i.e. about 0.05% by weight, of a mixture of various chlorinated propanes and propylenes containing 2-chloropropylene (boiling point 22.7° C.), 3.3-dichloropropylene (boiling point 36.5° C.), 2-chloropropane (boiling point 84.4° C.) and 1.2.3-trichloropropane (boiling point 157° C.). The last-mentioned compound which, because of its high boiling point, was decisive for the success of the purification, was present in a quantity amounting to up to 0.6 kg. The contamination had a volume of about 1.3 cubic meters (measured at N.T.P.) in the vaporous state.

The contaminated hydrochloric acid which had a temperature of 40° C. was heated first to about 65° C. by heat exchange with the purified hydrochloric acid emanating from the apparatus used for the purification. During this operation the purified acid flowing out of the apparatus while boiling at about 70° C. cooled to about 45° C. The contaminated acid thus preheated was introduced at the upper end of the lower packed column through which it trickled. While the acid flowed through the tubes the heat-exchanger arranged below the lower packed column and serving as evaporator was heated in the jacketed space with saturated steam which was under a pressure of three atmospheres (gauge) and had a temperature of 142° C. The dimensions of the heat exchanger were such that about 60,000 kilogram calories per hour were transferred to the acid trickling through. At the top of the upper packed column 180 kg./hr. of water at boiling temperature were introduced and about 50 kg./hr. of steam escaped carrying off the contaminations.

The purified acid flowing off from the lower packed column contained on an average 33.55% by weight of HCl. The content of remaining impurities was below 0.0002% by weight. When the contaminated hydrochloric acid was supplied to the lower packed column at a temperature of 40° C. without having previously been heated, about 225,000 kilogram calories per hour instead of 60,000 kilogram calories per hour had to be transferred in the heat exchanger. In this case the quantity of contaminations remaining in the purified acid amounted to about 0.001%.

We claim:

1. A process for purifying contaminated aqueous hydrochloric acid, said acid being of at least 30 percent concentration and containing dissolved or suspended volatile contamination, said purifying being conducted without substantial loss of acid concentration comprising:
    (a) introducing the contaminated aqueous hydrochloric acid in a distributed state into a first purification zone at the top thereof and conducting said contaminated aqueous hydrochloric acid downwardly through said first zone,
    (b) heating said acid as it is conducted downwardly toward the base of said first purification zone to evaporate the contamination and a portion of the hydrochloric acid, whereby the hydrogen chloride vapors and the evaporated contamination rise through said first purification zone,
    (c) collecting the remaining purified hydrochloric acid which is conducted completely through said first purification zone at the base thereof,
    (d) passing the hydrogen chloride vapors and the evaporated contamination upwardly from said first purification zone into the base of a second purification zone located directly over and in communication with said first purification zone, whereby the hydrogen chloride vapors and the evaporated contamination pass upwardly through said second purification zone,
    (e) introducing a stream of hot water into the top of the second purification zone and passing the stream of water countercurrently to the upwardly rising hydrogen chloride vapors and the evaporated contamination, whereby the stream of water partially evaporates to form steam which picks up the evaporated contamination while the hydrogen chloride vapors are absorbed by the remaining water,
    (f) passing the steam and the contamination out of said second purification zone, and
    (g) returning the water containing the absorbed hydrogen chloride vapors to the top of the first purification zone and combining therein with the acid to be purified.

2. The process of claim 1 wherein the heating is accomplished by supplying steam directly into the first purification zone at the base thereof in contact with said acid.

3. The process of claim 1 wherein the heating is accomplished by an evaporator located at the base of said first purification zone.

4. The process of claim 1, wherein the hot water flowing counter-currently to the evaporated contaminations and evaporated hydrogen chloride gas is used in a proportion such that the remaining portion of the hot water stream, after absorption of the hydrogen chloride vapors, is returned in the form of hydrochloric acid of a concentration of about 30% to about 32% by weight into the hydrochloric acid to be purified.

References Cited by the Examiner

UNITED STATES PATENTS

| | | | |
|---|---|---|---|
| 1,906,467 | 5/33 | Heath | 23—154 X |
| 2,047,611 | 7/36 | Baxter | 23—154 X |
| 2,392,047 | 1/46 | Kassel | 23—154 X |
| 2,402,978 | 7/46 | Allen et al. | 23—154 |
| 2,545,314 | 3/51 | Seebold | 23—154 |

FOREIGN PATENTS 600,459  6/60  Canada.

GEORGE D. MITCHELL, *Primary Examiner.*

NORMAN YUDKOFF, *Examiner.*